INVENTORS:
BIRGER HÖNNINGSTAD
AND GISLE SKANSEN
BY Robert H. Jacob
AGT.

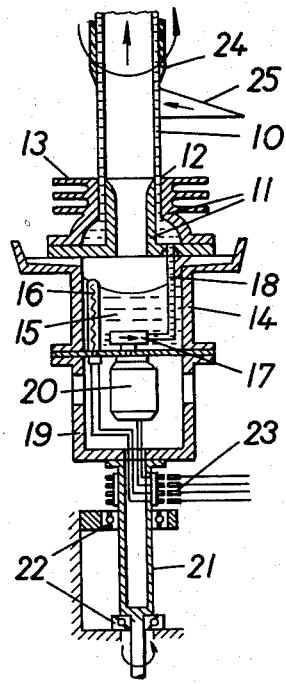
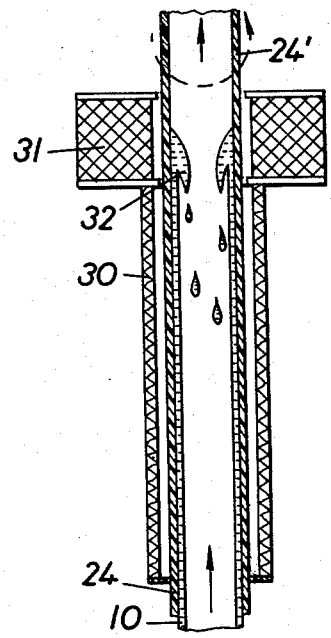
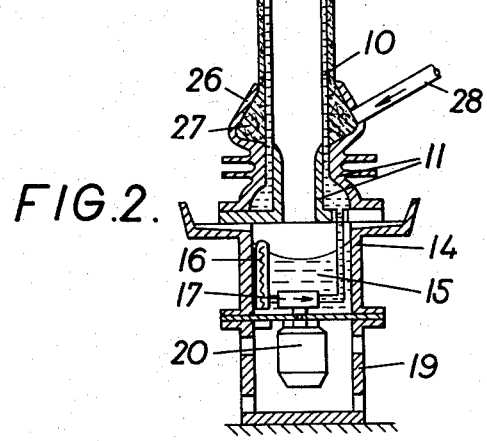
FIG.1.
FIG.2.
FIG.3.
INVENTORS
BIRGER HÖNNINGSTAD
AND GISLE SKANSEN
BY Robert H. Jacot.
AGT.

United States Patent Office 3,113,897
Patented Dec. 10, 1963

3,113,897
METHOD AND APPARATUS FOR MAKING FIBER REINFORCED PLASTIC TUBES
Birger Hönningstad, Chr. Augusts Gate 9, Oslo, Norway, and Gisle Skansen, Haukeliveien 6, Drammen, Norway
Filed Nov. 12, 1959, Ser. No. 852,449
Claims priority, application Norway Dec. 5, 1958
4 Claims. (Cl. 156—155)

The present invention is concerned with the production of seamless tubes of thermosetting plastic material. The tubes may be produced in any useful, desired lengths, diameters and wall thicknesses.

It is characteristic of this type of plastic material, which for instance may be polyester or epoxy, that it polymerizes by being heated, or alternatively by the addition of catalyst and accelerator. During the period between liquid and solid state it is highly desirable that the material is left undisturbed, which is one of the main reasons why it is difficult or impossible to produce such tubes by extruding.

It is common practice to reinforce such plastic articles with glass fibers or the like, which imparts great strength to the article. It is known to produce tubes from such glass fiber reinforced plastic material by hand or machinery. Different industrial processes have been developed in which a certain degree of mechanization and continuity of production have been obtained. However, all the methods known heretofore are more or less cumbersome and involve considerable manpower and supervision, the result being a rather expensive product.

It is an object of the invention to provide an improved method for producing fiber reinforced plastic tubes continuously, fully automatically and without manual labor.

It is a further object of the invention to provide a method for producing fiber reinforced plastic tubes which permits of changing the wall thickness of the tube and the reinforcement pattern while the machine is running. Thus, it is possible to produce tubes of different strength and according to different specifications, without stopping the machine.

According to the present invention the plastic resin and the fiber material are applied continuously and in the desired thickness on a metal core of an easily fusible alloy, which core is produced continuously by a pressure casting orifice thereby affording continuous axial movement past the place at which the plastic material and the fibers are applied.

The metal core, being preferably a tube with the glass fiber reinforced plastic material layer applied thereon, is thereafter passed through a heated zone or tunnel in which the plastic material is hardened. Thereupon it passes an electric induction oven so that the metal of the core is heated above its melting point and is thus melted down.

Since the process is preferably carried out in a vertically upward direction, the molten metal falls down by gravity through the inside of the lower part of the tube-shaped core or mandrel and is collected in the molten metal reservoir which supplies the metal for the casting orifice. By producing the tubular mandrel in an upward vertical direction and melting its upper end with induction heating whereby the metal immediately after being melted is carried out of the inductive heating zone by the action of gravity, there is provided the special advantage of assuring that the molten metal is not overheated after being melted and eliminates the need for special automatic temperature controls in the melting zone.

The melting point of the metal alloy may be chosen to be between the hardening temperature of the resin and the heat resistance limit temperature of the hardening plastic material. For example, if the established hardening temperature of the resin is 120° C. and the safe heat resisting temperature of the cured resin is 180° C., a eutectic metal having a melting point of about 140° C. will be a suitable alloy for the tube-shaped core or mandrel. In molten state such alloy has a very low viscosity, and the hardened plastic tube will be freed from its metal core when leaving the melting zone, such as an induction heater.

The eutectic metal has the further advantage of facilitating the use of a true casting method for forming the tubular mandrel instead of an extrusion method which is commonly used for plastic range materials and which requires considerable force for its performance. The eutectic metal practically reaches its full strength at the moment of solidification, which causes even a comparatively thin walled tubular mandrel to be self-supporting right from the casting orifice. The mandrel keeps its full strength right up to the melting zone at its upper end. When melting takes place the eutectic metal suddenly becomes fully liquid, which again causes a rapid removal of molten metal by gravity. This is in contrast to the use of plastic range materials where the melting occurs over a temperature range characterized by a very high average viscosity. The non-soldering property of eutectic material facilitates and ensures a complete separation of molten metal from the plastic tube wall as the finished plastic tube leaves the mandrel melting zone.

The invention provides a further advantageous feature in that the continuously upward moving finished plastic tube is cut in suitable lengths by means of an automatically operating saw in a manner known per se.

Further objects and advantages of the invention will become apparent from the following specification with reference to the accompanying drawings, in which FIG. 1 is a partial schematic sectional view of an embodiment of the invention;

FIG. 2 is a partial schematic section view of an alternate embodiment of the invention;

FIG. 3 shows a curing oven adapted for use with the apparatuses in accordance with FIGS. 1 through 5;

Figure 4:
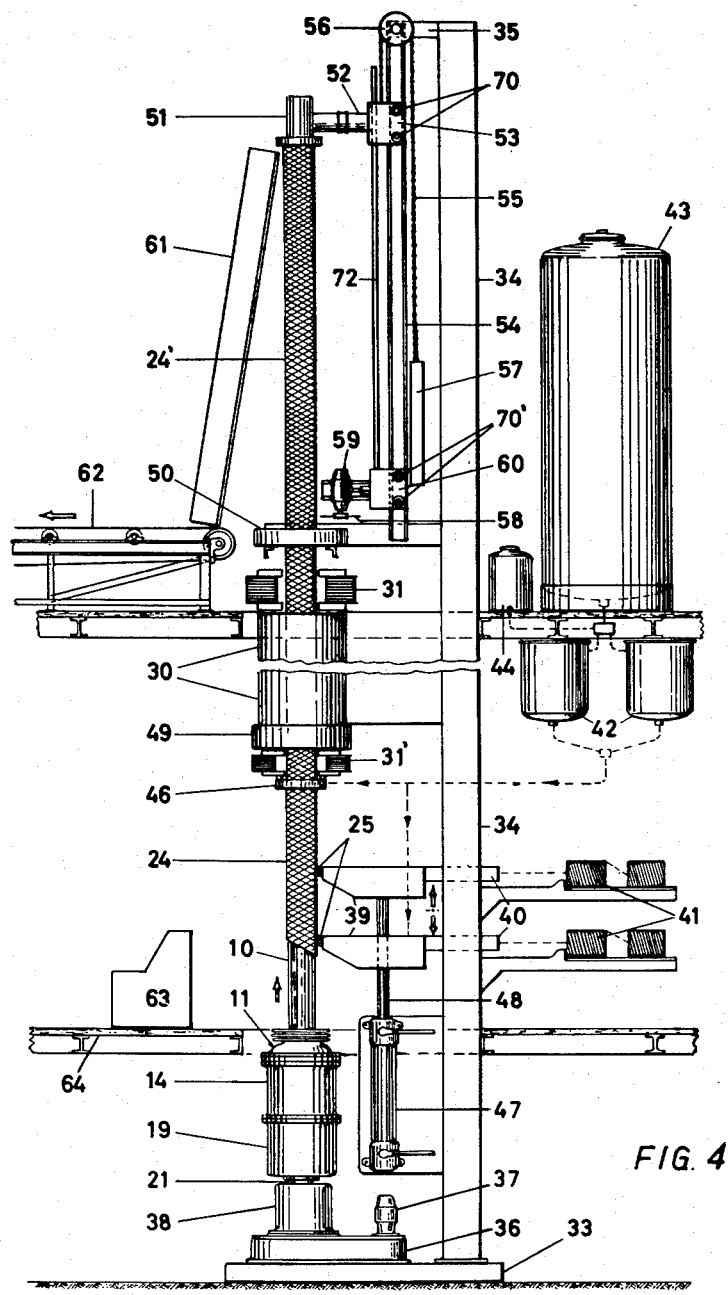
FIG. 4 shows in diagrammatic form a complete plant in accordance with the invention.

FIGS. 1 through 5 show a device for continuous vertical production of a tubular mandrel 10, consisting of a hollow casting mold 11 with an extruding or casting orifice 12 encompassed by a cooling device 13, and a pressure pump 17 which is connected with an electric motor 20 and arranged within a crucible 14. Pressure pump 17 and casting mold 11 are interconnected by a pressure pipe 18 which conveys molten metal under pressure from pump 17 to mold 11. Crucible 14 is situated below the casting mold 11 and contains a supply of fusible alloy 15. The fusible alloy is heated by means of a thermostatically controlled electric heating device 16 which is also arranged within the crucible 14. All these parts are carried by a cylindrical housing 19 which is mounted on a hollow, vertical shaft 21 with integral cylindrical extensions 21' arranged for rotation in two bearings 22 taking up radial as well as axial forces.

By means of a driving unit of known type such as, for example, electric motor 37 and a suitable chain drive 65, the system comprising vertical shaft 21, cylindrical housing 19, crucible 14, casting mold 11, casting orifice 12, and the cast tubular mandrel 10 may be rotated at a desired speed. The motor 20 and the electric heating device 16 are supplied with electric current in known manner via brushes and slip rings 23 through suitable electric conductors 71. The two electric drive motors 20 and 37 are of the remote control variable speed type allowing the tubular mandrel 10 of fusible alloy to be cast continuously at a desired production rate, moving upward, and at the same time being rotated at a desired number of revolutions per minute.

Above the casting orifice 12 and the cooling device 13, a suitable resin material is applied to tubular mandrel 10 such as, for example, impregnated glass fiber tape or roving 25. Due to the axial movement and rotation of the tubular mandrel 10 the roving or tape is wound onto the tube in a thickness depending upon the speed of rotation and the axial movement as well as the dimensions and number of the rovings or tape. Thus, the tubular mandrel 10 is supplied with a glass fiber reinforced layer 24 of plastic material which is, thereafter, to be hardened.

The device in accordance with the embodiment of FIG. 2, similarly to FIG. 1, provides for the continuous production of tubular mandrel 10 and utilizes casting mold 11, pressure pump 17 connected with motor 20 arranged within crucible 14 as shown and described for FIG. 1. The crucible contains molten metal 15, the temperature of which is controlled by electric thermostatically controlled heating device 16.

Contrary to the arrangement shown in FIG. 1, the parts 11, 14, 17 and 20 of this embodiment do not rotate. As in FIG. 1 the tubular mandrel 10 is produced vertically upward. An additional mold 26 is arranged above the casting mold 11 to which is supplied a premix 27 consisting of cut glass fibers and resin delivered through a supply tube 28. By means of the additional mold 26 a layer 29 of glass fiber and resin is applied upon the metal tube 10 in the desired thickness while it moves upward.

The method of using a continuously cast tube, which later on is continuously melted down, as a mandrel for resin impregnated glass fiber roving or tape winding, may also be adapted by rotating the winding apparatus while the mandrel itself does not rotate when moved upward.

FIG. 3 illustrates a curing oven which may be combined with the devices as shown in FIGS. 1 and 2 and is placed above the zone where the application of resin-impregnated glass fibers takes place. A curing oven or tunnel 30 encompasses the tubular mandrel 10 with the resin impregnated glass fibers 24 applied thereon as it passes through the oven. The curing oven may preferably be electrically heated and provided with automatic regulating means so as to maintain a curing temperature favorable to the hardening of the plastic layer. The length of the oven 30 is to be chosen according to the velocity of the plastic tube production so as to keep the tube within the oven for a sufficient time to have the hardening completed.

An electric induction heater 31 is arranged above the curing oven 30, the active zone of which encompasses the tubular mandrel 10 covered with the now cured glass fiber reinforced plastic tube 24′ which is now hardened. The induced electric currents generated in the tubular mandrel 10 as it passes through the heater will heat the upper end of tubular mandrel 10 and melt it, whereby the molten metal 32 falls down through the still rigid part of the tubular mandrel 10 extending from the underside of the electric induction heater 31 to the cooling device 13 through the hollow casting mold 11 and back to the supply 15 of molten metal.

Figure 5:
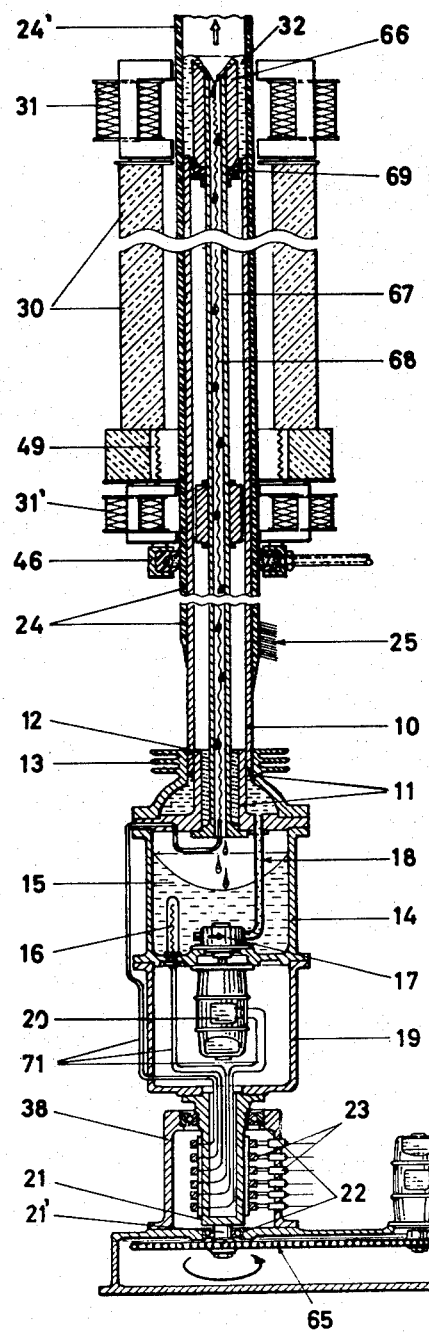
FIG. 5 is a cross sectional view of the structure shown in FIG. 4.

The molten metal 32 is preferably collected in a funnel 66 shown in FIG. 5 from which it falls by gravity down through a heated metal tube 67 which is provided with electric heating elements 68 arranged within the tubular mandrel 10. The metal tube 67 which supports the funnel 66 is fastened to hollow casting mold 11. Funnel 66 may be provided at its lower end with a resilient gland 69 to prevent molten metal from escaping down along the inner wall of the tubular mandrel 10. Below the curing oven 30, may be provided an infrared radiation tunnel 49, an electric induction heater 31′, and a charging mold 46.

In this way the finished hardened plastic tube 24′ will rise continuously out of the electric induction heater 31 completely freed from its tubular mandrel 10 which served as a support during the weak phase of the plastic material.

The complete automatically operating plant for the production of glass fiber reinforced plastic tubes in accordance with FIGS. 4 and 5 is mounted on a base 33 supporting an upright machine frame 34 having top beams 35. The base 33 supports a casing 36 and housing 38 providing bearings for the hollow main shaft 21 of the machine and gearing. The shaft is rotated by a motor 37 by means of a chain drive 65. Fixed to the top of the casing 36 is a housing 38 in which slip rings and brushes 23 for the electric supply and control signals are located as described hereinafter. The electric conductors 71 are passed through the hollow main shaft 21 to the locations where the electric power is used. The main shaft is connected to a housing 19 which forms the housing for motor 20 (FIG. 1), the speed of which may be regulated. This motor drives pressure pump 17 (FIG. 1) arranged in crucible 14 in which metal is molten. The crucible is furthermore equipped with a thermostatically regulated heating element and is filled with molten, easily fusible metal alloy of the kind described above. The pump 17 (FIG. 5) provides the casting mold 11 with molten metal under pressure. In this casting orifice 12 the metal is cooled and passes upwardly out of the orifice in the form of tubular mandrel 10, as described above.

Immediately above the casting orifice 12 two impregnating devices 39 are arranged through which the glass fiber rovings pass between rollers in a resin bath so that the roving threads are wetted with resin, whereby simultaneously the air in the threads is removed and superfluous resin pressed out. The glass fiber rovings are pulled out from the center of coreless coils 41 and are passed through heating channels 40 and through holes in the left vertical walls of the impregnating devices 39 opposite to the tubular mandrel 10. Provision is made as described below for a controlled up and down movement of the impregnation devices 39 so that the rovings may be applied in crosswise layers to increase the tensile strength of the plastic tube in its longitudinal direction.

Two mixing containers 42 serve to alternately supply activated resin to which are added dye and other components. One of the containers delivers the resin mixture, while the other is being filled with resin from the main tank 43 and with the other components from the subsidiary tank 44. The activated resin is distributed to both resin baths in the devices 39, as shown in dotted lines. The same resin mixture is also supplied to a charging nozzle 46 to be described below.

It should also be mentioned that the amount of heat supplied to the glass fiber roving in the heating channels 40 should not be of such value that the temperature of the resin in the baths within the devices 39 exceeds the critical gelatinating temperature.

The devices 39 are interconnected by means of a rod 48 and are moved up and down with the desired speeds by means of a piston and cylinder 47 which are hydraulically operated and comprise means not shown for regulating the speeds.

The resin-impregnated rovings passing out from the devices 39 will be wound on the tubular mandrel 10 in accordance with the rotation and axial movement thereof, and as a result of the movements of the devices 39, so as to be applied in crosswise layers partly overlapping and partly covering one another. In this way the tubular mandrel 10 is supplied with a wicker work of impregnated glass fiber rovings. The movements of the devices 39, the thickness and number of the roving threads, the rotation of speed of the tube as well as the amount of resin, determine in a known manner the quality, strength, wall thickness etc., of the resin impregnated tube to be made.

The glass fiber tube 24' built up in this way thereupon passes through the charging nozzle 46 which applies a thin outer resin layer upon the tube and smoothes the surface of the wound tubing.

It may also be mentioned, though not shown in the drawing, that it is also possible to apply a thermoplastic tape, such as between the two impregnating devices 39 or above or below same, so as to produce glass fiber reinforced plastic tubes having a thermoplastic layer either in the center of the tube wall or outermost or innermost on same. As known from other methods of production of fiber reinforced tubes, such precaution may in certain cases be of advantage.

The still unhardened plastic tube is then passed upward through an electric induction heater 31' together with its metal core. The eddy currents induced in the tubular mandrel 10 by the electric induction heater 31' will heat the metal mandrel to a temperature just below the melting point of the metal thereby applying heat to the resin from the inner side of the built-up tube 24. Thereafter tubular mandrel 10 with the applied resin impregnated glass fibers is passed through a tunnel 49 with infrared radiation so as to supply further heat to the glass fiber reinforced plastic. The amount of heat supplied to the glass fiber plastic material by means of the heating channels 40, the electric heater 31' and the infra-red radiation tunnel 49 is to be chosen in accordance with the exothermic heat development of the plastic material, and is regulated in such way that the desired hardening temperature is obtained.

It is to be noted that the hardening temperature is one of the deciding factors for the hardening time, which is of the greatest importance in a continuous process as this one. When the amount of heat applied to the glass fiber reinforced plastic tube is chosen correctly, the tube will be completely hardened and remain hard after having passed out of the curing oven 30 following the infra-red radiating tunnel 49.

After passing through curing oven 30 tubular mandrel 10 and the now hardened plastic tube 24' are passed through a further induction heater 31 which will heat the metal in the tubular mandrel 10 by eddy currents so that it is molten. The molten metal is collected by a funnel 66 arranged within the tubular mandrel 10 as described above. The funnel is connected with a heated metal tube 67 leading down to the crucible 14 so that the molten metal is brought back and can again take part in the circuit as mentioned above.

After having been freed in this way from the tubular mandrel 10 the hardened glass fiber reinforced plastic tube will be self-supporting and ascends further up through centering and supporting guiding rollers arranged within the ring 50. Above this ring an automatically operating, cutting disk 58 driven by motor 59 and mounted on carriage 60 is arranged which is carried along with the tube 24' by the axial movement of same. Further, it may be noted that the cutting disk 58 and carriage 60 are carried upwards by action of the rising hardened plastic tube 24', which exerts an upward force via gripping mechanism 51, arm 52, carriage 53 and connecting rod 72, thereby causing the carriage 60 and the cutting disk 58 to follow the vertical movement of the plastic tube 24' while the cutting operation is performed. The cutting disk will cut the tube in a predetermined length. Before being cut the tube is caught by a freely rotating gripping mechanism 51, which by way of an arm 52 is carried by a carriage 53 having wheels 70 and moving along vertical rails 54. The carriage 53 is connected with a weight 57 by way of a chain 55 passed over a pulley 56 which freely rotates in the top 35 of the frame 34. By means of this weight the gripping device will exert a pull on tube 24' and thrust it laterally during the cutting operation. The cutting disk 58 is fixed to the shaft of a motor 59 which is also carried by a carriage 60 with wheels 70' moving on the same rails as the carriage 53. As soon as the cutting disk has been brought into contact with the tube 24', it will be carried with the tube together with the motor 59 and carriage 60 as long as the cutting disk engages the tube. The lateral movement of the cutting disk relative to the tube is controlled by means not shown which can be actuated by any suitable automatic means.

After having been cut through, the tube is moved aside by the gripping mechanism 51, the arm 52 carrying this mechanism consisting of two linked parts one of which may be swung by means not shown. The tube is placed by the gripping mechanism on a chute 61 along which the tube will slide and fall down on a conveyor 62 shown as a belt conveyor. It is understood that the gripping mechanism 51 and the cutting disk 58, motor 59 and carriage 60 are cooperating according to a predetermined sequence and brought back to their respective starting positions by means of an automatic driving means.

All speeds, temperatures and other process values may be indicated and regulated at a control desk 63 placed on the platform 64. Furthermore the machine is provided with a means for causing stop and/or giving warning when faults or irregularities occur.

The machine is so constructed that when it is to be changed from one tube diameter to another, it is only necessary to replace the casting mold 11 and charging nozzle 46, adjust the electric induction heaters 31 and 31' and carry out some changes at the control desk 63. For the production of different qualities of tubes having the same diameter it will be sufficient to carry out some changes at the control desk only.

A machine for producing tubes of 2–6 inches diameter and a length of about 6 feet per minute will have a total height of about 50 feet and may be served by one or two men, depending upon the particular plant. The annual production of such a machine will vary in some way depending upon the tube diameter and the wall thickness, but may easily be 1000 tons per year or more.

Having now described our invention with reference to the embodiments disclosed in the drawings, we do not wish to be limited thereto, but what we desire to protect by Letters Patent of the United States of America is set forth in the appended claims.

We claim:

1. A method for the production of a reinforced plastic tube comprising the steps of forming vertically upwardly a continuously rotating and continuously cast tubular mandrel of a low melting point eutectic alloy supplied from a crucible, winding onto said mandrel layers of resin impregnated fibers while imparting controlled up and down movements to the impregnating devices, curing said resin impregnated fibers around said mandrel to produce a tube, continuously melting down the upper end of said tubular mandrel within said tube, and returning the melted down end of said mandrel by gravity through the interior of the unmelted part of said mandrel to the crucible.

2. A method for the production of a reinforced plastic tube comprising the steps of forming vertically upwardly a continuously rotating and continuously cast tubular mandrel of a low melting point eutectic alloy supplied from a crucible of molten metal, winding onto said mandrel layers of resin impregnated fibers supplied through impregnation devices from stationary coreless coils while imparting controlled up and down movements to the impregnating devices, curing said resin impregnated fibers to produce a finished plastic tube, continuously melting down the upper end of said mandrel within said tube, and returning the melted down metal of the end of said tubular mandrel by gravity through the interior of the unmelted part of said mandrel to the crucible of molten metal.

3. An apparatus for the manufacture of reinforced plastic tubes comprising a crucible, a low melting point eutectic alloy provided in molten form in said crucible, means for continuously casting from said crucible a vertically upwardly moving tubular mandrel formed of said alloy, means for rotating said crucible and said mandrel, means including stationary coreless coils and impregnating devices for continuously supplying to the outer circumference of said mandrel resin impregnated fibers, means for imparting up and down movements to the impregnating devices, heating means for curing said resin impregnated fibers on said mandrel to produce a finished tube, electric induction heating means for continuously melting down the upper end of said rotating mandrel within said tube, and means arranged within said mandrel for collecting and conveying by gravity to said crucible through the interior of the unmelted part of said tubular mandrel the melted down end of said mandrel, said means comprising a funnel arranged adjacent the upper end of said mandrel, a pipe connecting said funnel to said crucible, and heating means for said pipe for keeping said melted down metal in molten form until it reaches said crucible by force of gravitation.

4. An apparatus for the manufacture of reinforced plastic tubes comprising a crucible, a low melting point eutectic alloy provided in molten form in said crucible, means for continuously casting from said crucible a vertically upwardly moving tubular mandrel formed of said alloy, means for rotating said crucible and said mandrel, means including stationary coreless coils and impregnating devices for continuously supplying to the outer circumference of said mandrel resin impregnated fibers, means for imparting up and down movements to the impregnating devices, heating means for curing said resin impregnated fibers on said mandrel to produce a finished tube, electric induction heating means for continuously melting down the upper end of said rotating mandrel within said tube, and means arranged within said mandrel for collecting and conveying by gravity to said crucible through the interior of the unmelted part of said tubular mandrel the melted down end of said mandrel, said means comprising a funnel arranged adjacent the upper end of said mandrel, and a pipe connecting said funnel to said crucible.

References Cited in the file of this patent
UNITED STATES PATENTS

| | | |
|---|---|---|
| 935,254 | Gleason | Sept. 28, 1909 |
| 1,604,274 | Gammeter | Oct. 26, 1926 |
| 1,631,071 | Snelling | May 31, 1927 |
| 1,656,312 | Black | Jan. 17, 1928 |
| 1,679,345 | Austin | Aug. 7, 1928 |
| 1,713,679 | Snelling | May 21, 1929 |
| 2,284,866 | Hansson | June 2, 1942 |
| 2,315,394 | Brosius | Mar. 30, 1943 |
| 2,491,152 | Beidle | Dec. 13, 1949 |
| 2,723,705 | Collins | Nov. 15, 1955 |
| 2,731,067 | Miller | Jan. 17, 1956 |
| 2,744,043 | Ramberg | May 1, 1956 |
| 2,993,526 | Young | July 25, 1961 |